Patented Dec. 9, 1930

1,784,402

UNITED STATES PATENT OFFICE

THEODORE B. WAGNER, OF BROOKLYN, NEW YORK

MONOSACCHARIDE MATERIAL

No Drawing.    Application filed July 30, 1923.    Serial No. 654,782.

My invention relates to a special monosaccharide carbohydrate material, which consists of a mixture containing dextrose and non-gummy dextrines and is of particular value as a base for the preparation of bakers' yeast as it is free from gummy dextrines which hinder the free circulation of the yeast cells in the yeast mass.

I obtain my carbohydrate base, broadly speaking, by an acid hydrolysis of starch, carried out not unlike that of glucose but differing therefrom in that I utilize the hydrolyzing action of the acid to break down not only the starch but the dextrines themselves, so that these dextrines eventually are changed into new bodies which no longer possess the objectionable characteristics of glucose dextrines, that is to say, they have no adhesive properties, are neither gummy nor mucilaginous, do not interfere with the free circulation of the yeast cells and therefore do not obstruct or impede the progress of normal fermentation. In fact, I claim that the application of my discovery will enable the manufacturer of yeast to conduct his process on most definite and standardized lines, the uncertainties resulting from the employment of disaccharide materials having been wholly eliminated by my new invention.

To obtain my non-gummy monosaccharide material I may proceed as follows: I prefer to use as my raw material starch as obtained from corn and employ it at that step of its manufacture where it is known as "green" or "table" starch, in which condition it contains approximately 50% of water, and in addition to the starch itself, certain impurities, such as gluten and fibre, also corn solubles remaining from the steep-water in which the corn was soaked prior to grinding. Any other starch or starchy material may be used, and wherever in my claim I refer to starch it is to be understood that this term likewise includes other starchy or amylaceous materials. To this green starch, after having been worked into a starch milk by the addition of a suitable amount of water, I add an appropriate quantity of a mineral acid, such as hydrochloric and then cook the mass in a closed vessel at a temperature corresponding to a pressure of 40 pounds per square inch. The cooking is conducted for about 30 to 40 minutes during which time the starch becomes liquefied and its bulk subsequently converted into dextrose. The process up to this point is standard practice in the manufacture of crystallized dextrose, well known to those skilled in the art, and I therefore do not enter into further details with respect to the same. I prefer to carry the conversion to a point where the dextrose content is not less than 90% calculated to dry substance basis. In carrying the conversion to a point corresponding to a dextrose content of 90%, on dry substance basis, I aim at a breaking down of the dextrines during the acid hydrolysis to such an extent that they lose the chief characteristics of the glucose dextrines, to wit, their gummy and mucilaginous condition. Besides the test (f. i. with Fehling solution) to determine that my substance contains approximately 90% of dextrose there is consequently advisable at this point of the process a second test to determine conclusively that the desired condition with reference to the dextrines has been reached. This second test may readily be made by placing the material between two sheets of paper subjecting the paper to gentle pressure and permitting the material to dry. If the papers can then be pulled apart so readily as to indicate substantial absence of adhesiveness the gummy (i. e. adhesive) dextrines have been eliminated. When these tests show that a sufficient breaking down of the dextrines has taken place and that the desired dextrose content has been reached the liquor is withdrawn from the vessel or "converter" the excess acidity is neutralized with commercial sodium carbonate the liquor passed through filter presses and then concentrated preferably in a multiple effect to a density corresponding to 30° Bé. At this gravity it is passed over bone black and subsequently further concentrated in vacuo until the water content has been reduced to approximately 14%. This concentrated liquor is cooled, dextrose crystals added as "seed" and the dextrose formed during the process of conversion is now permitted to crystallize and after such crystallizing process has been completed or nearly completed the crystallized dextrose is separated from the mother liquor and finished in the usual manner and sold as a separate commercial product. This treatment yields a syrup referred to hereinbefore as "mother liquor" which is composed substantially as follows:

|  | Per cent |
|---|---|
| Water | 20.5 |
| Dextrose | 57.5 |
| Non-fermentable carbohydrates | 19.5 |
| Ash | 2.5 |
|  | 100.0 |

The syrup thus obtained is characterized by its large content of fermentable dextrose and the absence of viscous and mucilaginous non-fermentable carbohydrates, the non-fermentable carbohydrates present being in so fine a state of colloidal dispersion that they do not tend to delay or inhibit the growth of the yeast; the syrup is also free from objectionable impurities such as frequently occur in black strap and tend to retard or stop the growth of the yeast.

I claim:

The new monosaccharide material which consists of a mixture of dextrose and non-gummy dextrines which may be produced by converting starch liquor by acid hydrolysis to a point at which the dextrines have lost their gummy and mucilaginous condition and is characterized by the absence of dextrines in a gummy and mucilaginous condition.

THEODORE B. WAGNER.